(12) United States Patent
Foreman

(10) Patent No.: US 6,370,083 B1
(45) Date of Patent: Apr. 9, 2002

(54) METHOD AND APPARATUS FOR DETECTING ACOUSTIC SIGNALS FROM A PLURALITY OF ACOUSTIC SIGNAL SENSORS

(75) Inventor: Carl R. Foreman, Rehoboth, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/638,797

(22) Filed: Aug. 10, 2000

(51) Int. Cl.[7] .................................................. G01S 3/80
(52) U.S. Cl. ........................ 367/126; 367/124; 367/129
(58) Field of Search ................................ 367/124, 126, 367/129

(56) References Cited

U.S. PATENT DOCUMENTS

| | | | | |
|---|---|---|---|---|
| 3,852,707 A | * | 12/1974 | Autrey | ........................ 367/126 |
| 3,922,634 A | * | 11/1975 | Warner | ........................ 367/126 |
| 4,965,835 A | * | 10/1990 | Hochstein | .................... 367/198 |
| 5,659,520 A | * | 8/1997 | Watson et al. | ............... 367/124 |

\* cited by examiner

Primary Examiner—Ian J. Lobo
(74) Attorney, Agent, or Firm—Michael J. McGowan; Prithvi C. Lall; Michael F. Oglo

(57) ABSTRACT

An apparatus and method for detecting acoustic signals from a plurality of acoustic signal sensors. The apparatus comprises a plurality of acoustic signal detection channels. Each channel has an input for receiving acoustic signals from a corresponding acoustic signal sensor and includes circuitry for amplifying the received acoustic signals, removing the D.C. components from the amplified acoustic signals and removing all frequency components from the amplified acoustic signals which are above a predetermined frequency. The apparatus further comprises a circuitry for summing all of the acoustic signals outputted from the acoustic signal detection channels to form a single acoustic signal and for converting the single acoustic signal into a differential signal if at least one acoustic signal sensor senses an acoustic signal and its corresponding acoustic signal detection channel outputs an acoustic signal.

12 Claims, 2 Drawing Sheets

METHOD AND APPARATUS FOR DETECTING ACOUSTIC SIGNALS FROM A PLURALITY OF ACOUSTIC SIGNAL SENSORS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to an apparatus and method for detecting acoustic signals from a plurality of acoustic signal sensors.

(2) Description of the Prior Art

Prior art acoustic signal detection devices typically use complex signal processing circuitry which conditions acoustic signals and performs signal processing functions upon such signals, e.g., Fast Fourier Transforms, to extract desired data. Such a device is disclosed in U.S. Pat. No. 4,017,859. Other prior art devices measure the cross-spectral density of received acoustic signals to determine the acoustic density in a particular direction. Such a device is disclosed in U.S. Pat. No. 4,982,375. Additionally, many prior art devices use complex circuitry to perform phase and magnitude detection and to effect conversion from rectangular to polar coordinates. One such device is described in U.S. Pat. No. 4,953,145. Still, other prior art devices utilize circuitry for the generation of frequency tones. For example, U.S. Pat. No. 3,588,802 utilizes a mechanical vibrator for exciting a frequency tone that is added to the received acoustic signal. Other prior art devices use a pair of hydrophones wherein each hydrophone is dedicated to receiving particular frequency components of acoustic signals. For example, U.S. Pat. No. 4,594,695 discloses a system that utilizes two hydrophones wherein one hydrophone receives a disturbed tracked signal and the other hydrophone receives spurious noises.

What is needed is a relatively less complex acoustic signal detection system that provides redundancy whereby the acoustic signal detection system receives and detects acoustic signals from a plurality of acoustic signal sensors (e.g. hydrophones) as long as one of the acoustic signal sensors senses an acoustic signal. Preferably, the redundancy should be realized by the overall design of the acoustic signal detection system so as to substantially increase the probability that acoustic signals sensed by the sensors will still be detected by the acoustic signal detection system even if this system experiences partial component failure. Another desired feature of such an acoustic signal detection system is that it must be relatively simple in construction in order to reduce the costs related to manufacturing, maintenance and repair.

Therefore, it is an object of the present invention to provide an apparatus and method for receiving and detecting acoustic signals from a plurality of acoustic signal sensors that fulfills a long-felt need that has not been met by prior art devices and methods.

Other objects and advantages of the present invention will be apparent to one of ordinary skill in the art in light of the ensuing description of the present invention.

SUMMARY OF THE INVENTION

The present invention is directed to an apparatus and method for detecting acoustic signals from a plurality of acoustic signal sensors. The apparatus comprises a plurality of acoustic signal detection channels. Each acoustic signal detection channel has an input for receiving acoustic signals from a corresponding acoustic signal sensor. Each acoustic signal detection channel further includes circuitry for (i) amplifying the received acoustic signals, (ii) removing the D.C. components from the amplified acoustic signals, and (iii) removing all frequency components from the amplified acoustic signals which are above a predetermined frequency. The apparatus further comprises circuitry for summing all of the acoustic signals outputted from the acoustic signal detection channels to form a single acoustic signal. The apparatus further comprises additional circuitry for converting the single acoustic signal into a differential signal and outputting the differential signal if at least one acoustic signal sensor senses an acoustic signal and the corresponding acoustic signal detection channel outputs an acoustic signal.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which like reference numerals refer to like parts and in which:

DESCRIPTION OF THE PREFERRED EMBODIMENT

Figure 1:
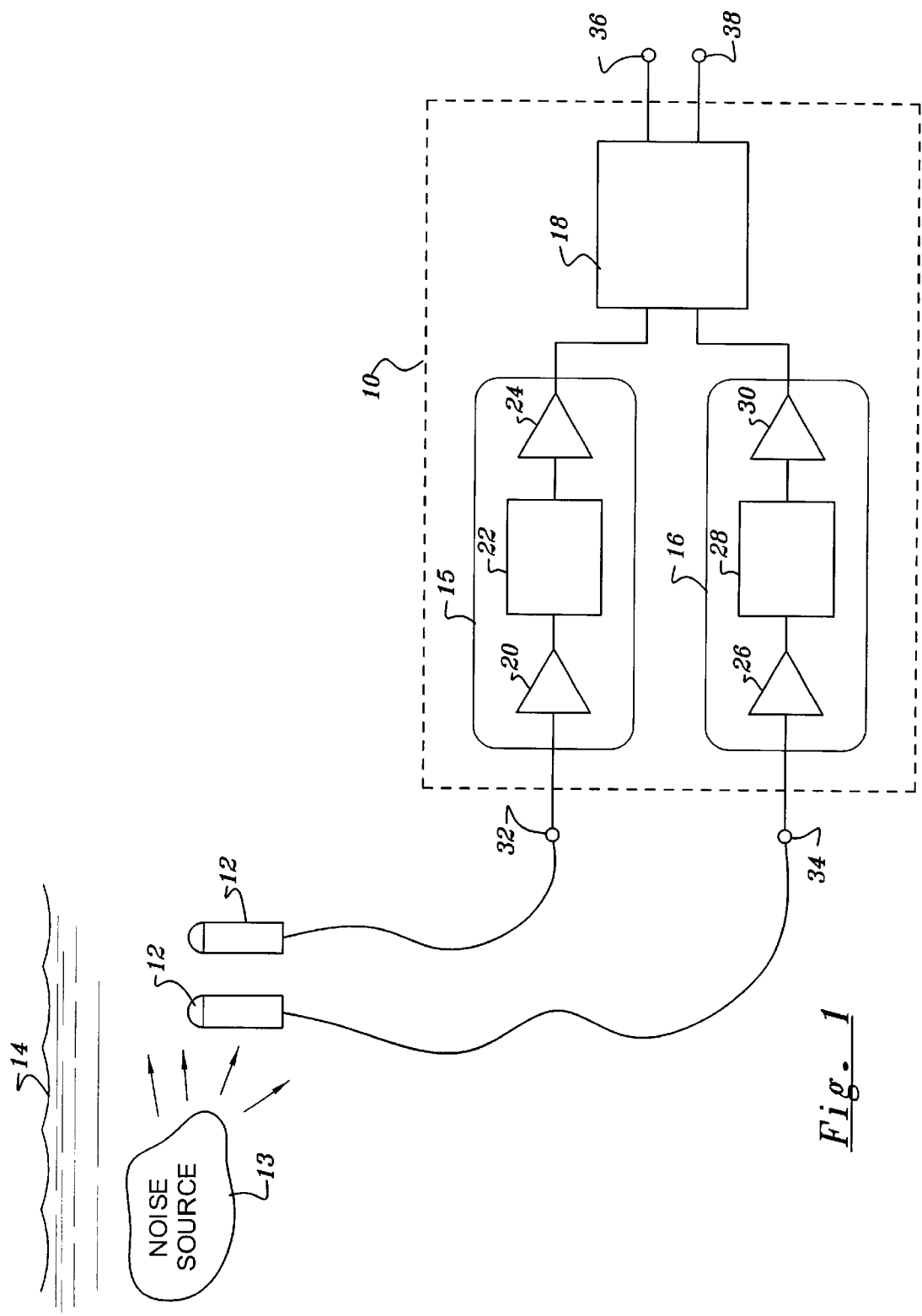
FIG. 1 is a block diagram of the apparatus of the present invention.

Referring to FIG. 1, apparatus 10 of the present invention receives acoustic signals from acoustic signal sensors or hydrophones 12 positioned beneath the surface of ocean 14. The acoustic signals originate from noise source 13. Apparatus 10 generally comprises acoustic signal detection channels 15 and 16 and circuit 18. Channel 15 comprises preamplifier 20, filter circuit 22 and amplifier circuit 24. Similarly, channel 16 comprises preamplifier 26, filter circuit 28 and amplifier circuit 30. Channels 15 and 16 are identical in design and construction. The output of each channel 15 and 16 is coupled into circuit 18. Circuit 18 is described in detail in the ensuing description.

Figure 2:
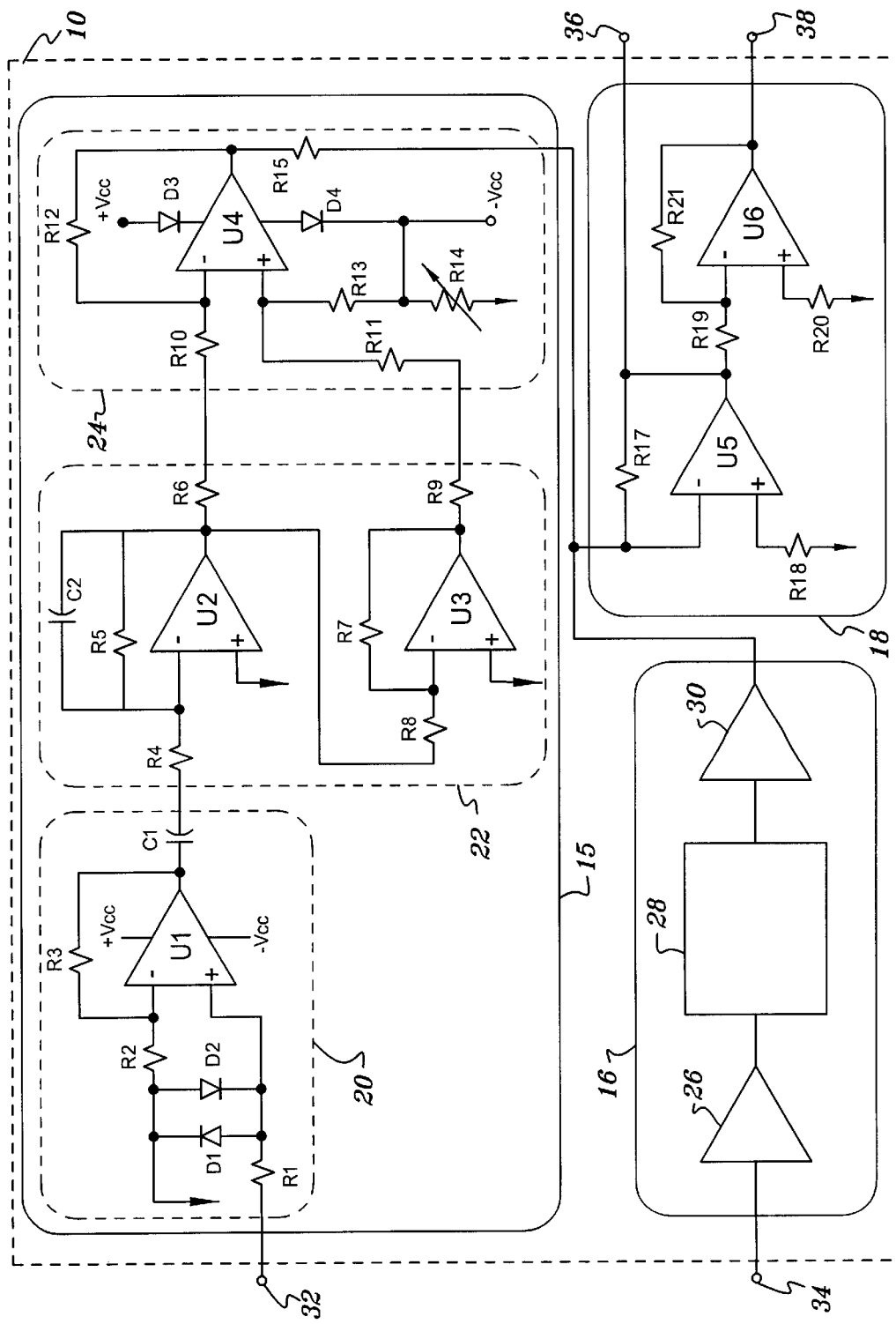
FIG. 2 is a diagram, partially in schematic form, showing electrical circuits that are used to realize the apparatus of FIG. 1.

Referring to FIGS. 1 and 2, acoustic signals received from hydrophones 12 are inputted into inputs 32 and 34 of apparatus 10. Inputs 32 and 34 are connected to the inputs of preamplifier circuits 20 and 26, respectively. FIG. 2 shows one embodiment of the internal electrical circuitry of channels 15 and 16 and circuit 18. Since channels 15 and 16 are identical in design and construction, only channel 15 is described in detail in the ensuing description. Preamplifier circuit 20 amplifies the low level acoustic signals and removes the D.C. (Direct Current) level from these signals. Preamplifier circuit 20 comprises amplifier U1. Amplifier U1 comprises an operational amplifier having an inverting input, a non-inverting input and an output. In one embodiment, amplifier U1 has the operational characteristics of the commercially available LF147 or LF347 operational amplifiers manufactured by National Semiconductor and Texas Instruments. However, it is to be understood that other operational amplifiers having operational characteristics similar to the aforementioned LF147 or LF347 operational amplifiers can also be used. Amplifier U1 includes a terminal for connection to a positive power supply voltage source +Vcc. Amplifier U1 also includes a terminal for connection to a negative power supply voltage source −Vcc. In one embodiment, +Vcc is about +15 VDC and −Vcc is about −15 VDC.

Referring to FIG. 2, resistor R1 is connected between input 32 and the non-inverting input of amplifier U1. Resistor R2 is connected between ground potential and the inverting input of amplifier U1. In one embodiment, each resistor R1 and R2 has a resistance of about 249Ω. Diodes D1 and D2 are connected between ground potential and the non-inverting input of amplifier U1. Specifically, the anode of diode D1 is connected to the non-inverting input of amplifier U1 and the cathode is connected to ground potential. The cathode of diode D2 is connected to the non-inverting input of amplifier U1 and the anode is connected to ground potential. Diodes D1 and D2 serve to protect channel 15 from high-level voltage spikes and in particular, electromagnetic pulses ("EMP"). Resistor R3 functions as a feedback resistor and is connected between the output and inverting input of amplifier U1. In one embodiment, resistor R3 has a resistance of about 1.4 KΩ.

In a preferred embodiment, preamplifier circuit 20 is configured to provide a gain between about 500 and 1500. In one embodiment, preamplifier circuit 20 provides a gain of about 1000. The output of amplifier U1 is coupled to one end of capacitor C1. In one embodiment, capacitor C1 has a capacitance of 0.01 micro-farads. Capacitor C1 prevents the D.C. component of the amplified acoustic signals from entering filter circuit 22.

Referring to FIGS. 1 and 2, filter circuit 22 functions as a low pass filter. Filter circuit 22 comprises amplifier U2. Amplifier U2 comprises an operational amplifier having an inverting input, a non-inverting input, an output and terminals for connection to +Vcc and −Vcc. In one embodiment, amplifier U2 has the operational characteristics of the aforementioned LF347 operational amplifier. However, it is to be understood that other operational amplifiers having operational characteristics similar to the LF347 amplifier can also be used. Filter circuit 22 further includes resistors R4 and R5 and capacitor C2. Amplifier U2, resistors R4 and R5 and capacitor C2 are connected to form a low pass filter which has a predetermined cut-off frequency Fc. In a preferred embodiment, the cut-off frequency Fc is between about 100 kHz and 300 kHz. In one embodiment, capacitor C2 has a capacitance of 100 picofarads and resistor R5 has a resistance of about 10 KΩ so as to provide a cut-off frequency Fc of about 160 kHz. However, it is to be understood that the capacitance of capacitor C2 and the resistance of resistor R5 can be chosen so as to provide a different cut-off frequency Fc. In one embodiment, the resistance of resistor R4 is about 3.01 KΩ. The gain of the low pass filter realized by amplifier U2, resistors R4 and R5 and capacitor C2 is represented by the ratio R5/R4. Filter circuit 22 further includes resistor R6 which has one end thereof connected to the output of amplifier U2 and the other end connected to resistor R10 which is described in the ensuing description. In one embodiment, resistor R6 has a resistance of about 49.9Ω.

Referring to FIG. 2, filter-circuit 22 further comprises amplifier U3 and resistors R7 and R8. Amplifier U3 can be realized by the commercially available LM741 operational amplifier, manufactured by several manufacturers including National Semiconductor and Texas Instruments. Amplifier U3 can also be realized by the commercially available LF147 and LF347 operational amplifiers which were previously discussed herein. Amplifier U3 and resistors R7 and R8 are connected together to provide an inverting buffer amplifier. Similar to amplifiers U1 and U2, amplifier U3 includes terminals for connection to +Vcc and −Vcc. Resistor R7 functions as a feedback resistor and is connected between the output and inverting input of amplifier U3. Resistor R8 is connected between the inverting input of amplifier U3 and the output of amplifier U2. In a preferred embodiment, resistors R7 and R8 have resistances that provide unity gain. In one embodiment, resistors R7 and R8 each have a resistance of 3.01 KΩ. Filter circuit 22 further includes resistor R9 that is connected between the output of amplifier U3 and one end of resistor R11. In one embodiment, resistor R9 has a resistance of about 49.9Ω.

Referring to FIGS. 1 and 2, the output signals of amplifiers U2 and U3 are inputted into amplifier circuit 24. Amplifier circuit 24 comprises amplifier U4, resistors R10, R11, R12, R13 and variable resistor or potentiometer R14. Amplifier U4 includes an inverting input, a non-inverting input, an output and +Vcc and −Vcc terminals. In one embodiment, amplifier U4 can be realized by the commercially available LM741, LF147 or LF347 operational amplifiers previously discussed herein. Amplifier U4, resistors R10, R11, R12, R13 and variable resistor R14 are connected to provide an inverting summing circuit with unity gain. Resistor R10 is connected between one end of resistor R6 and the inverting input of amplifier U4. Similarly, resistor R11 is connected between one end of resistor R9 and the non-inverting input of amplifier U4. Resistor R12 is a feedback resistor and is connected between the output and inverting input of amplifier U4. In one embodiment, resistors R10, R11 and R12 each have a resistance of about 10 KΩ. Resistor R13 is connected between the non-inverting input of amplifier U4 and the negative power supply −Vcc. Resistor R13 functions as biasing resistor. In one embodiment, resistor R13 has a resistance of about 9 KΩ. Variable resistor R14 provides the ability to adjust offset voltages. In one embodiment, variable resistor has a resistance range between about 0Ω and 200Ω.

Referring to FIG. 2, amplifier circuit 24 further comprises diodes D3 and D4. Diode D3 is connected between the +Vcc power supply voltage and the +Vcc terminal of amplifier U4 such that diode D3 is forward biased. In this configuration, diode D3 blocks current from flowing into the +Vcc power supply voltage source. Similarly, diode D4 is connected between the −Vcc power supply voltage and the −Vcc terminal of amplifier U4 such that diode D4 is forward biased. In this configuration, diode D4 blocks current from flowing into the −Vcc power supply voltage source. Amplifier circuit 24 further includes output resistor R15. Resistor R15 is connected between the output of amplifier U4 and the input to amplifier circuit 18. In one embodiment, resistor R15 has a resistance of about 10 KΩ.

Referring to FIGS. 1 and 2, the output of amplifier circuit 24 is fed into circuit 18. Circuit 18 comprises two stages. The first stage is a summing circuit which is comprised of amplifier U5 and resistors R17 and R18. In one embodiment, amplifier U5 is configured to have the operating characteristics of the commercially available LF147 operational amplifier previously described herein. However, it is to be understood that amplifier U5 can be configured to have the operational characteristics of the other commercially available operational amplifiers previously described herein. Resistor R15 of circuit 24 is connected between the output of amplifier U4 and the inverting input of amplifier U5. Similarly, the output of circuit 30 is connected to the inverting input of amplifier U5. Resistor R17 is a feedback resistor connected between the output and inverting input of amplifier U5. In one embodiment, resistor R17 has a resistance of about 10 KΩ. Resistor R18 provides offset compensation. In one embodiment, resistor R18 has a resistance value of about 2.5 KΩ. The output of amplifier U5 is connected to output terminal 36 and is also fed into the second stage of circuit 18. The second stage functions as a differential amplifier and comprises amplifier U6 and resistors R19, R20 and R21. In one embodiment, amplifier U6 is configured as an operational amplifier that has operational characteristics similar to the commercially available LF147 operational amplifier. However, amplifier U6 can also be configured as any of the commercially available operational amplifiers previously described herein. Resistor R19 is connected between the output of amplifier U5 and the inverting input of amplifier U6. Resistor R21 is a feedback resistor and is connected between the inverting input and the output of amplifier U6. In one embodiment, resistors R19 and R21 each have a resistance of about 10Ω. Resistor R20 provides offset compensation. In one embodiment, resistor R20 has a resistance of about 2.5 KΩ. The output of amplifier U6 is connected to output terminal 38.

The magnitude of the signal measured between output terminals 36 and 38 represents the difference in magnitudes between the acoustic signals outputted from channels 15 and 16. Apparatus 10 outputs a signal between terminals 36 and 38 if at least one of hydrophones 12, and the detection channel to which it is connected, are functioning properly. Specifically, apparatus 10 outputs a signal between terminals 36 and 38 if at least one of hydrophones 12 senses an acoustic signal and the corresponding acoustic signal detection channel outputs an acoustic signal. Thus, the internal circuitry of apparatus 10 provides built-in redundancy thereby ensuring that acoustic signals are detected even if one of the hydrophones and/or one of the detection channels have failed.

Although apparatus 10 has been described as having two detection channels that are connected to the corresponding hydrophones, it is to be understood that apparatus 10 can be configured to have a plurality of detection channels wherein each detection channel is connected to a corresponding hydrophone.

Output terminals 36 and 38 can be connected to peripheral electronic analysis equipment such a computer, oscilloscope, video monitor, cathode-ray-tube, liquid-crystal-display, etc. Analog-to-digital conversion circuitry, and driver or buffer circuitry, well known in the art, may be needed to couple the signal outputted at terminals 36 and 38 to the aforementioned analysis equipment.

Although the foregoing description is in terms of the resistors and capacitors in apparatus 10 having the stated resistances and capacitances, respectively, it is to be understood that the resistors and capacitors can have different resistance and capacitance values, respectively. It is also to be understood that decoupling capacitors are connected between the +Vcc or −Vcc terminals of all amplifiers and ground potential in a manner well known in the art. Additionally, amplifiers U1, U2, U3, U4, U5 and U6 can also be realized by discrete components such as NPN or PNP transistors, or n-channel or p-channel field effect transistors.

In one embodiment, +Vcc is about +15 VDC and −Vcc is about −15 VDC. However, it is to be understood that the circuits described herein can be configured to operate with positive and negative power supply voltage sources having other magnitudes, e.g. +12 VDC, −12 VDC, etc.

Thus, the system of the present invention achieves the objects set forth above. Specifically, the system of the present invention:

a) utilizes a plurality of acoustic signal detection channels that provide redundancy to ensure that acoustic signals will be detected in the event of failure of any of the hydrophones or acoustic signal detection channels;

b) provides accurate and consistent measurements;

c) can be implemented with a variety of hardware components; and d) can be implemented at a relatively low cost.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An acoustic signal detection apparatus comprising:

a plurality of acoustic signal detection channels, each of which having an input for receiving acoustic signals from a corresponding acoustic signal sensor and processing circuitry to provide a processed acoustic signal when an acoustic signal is detected, the processing circuitry including a filter circuit for removing from the received acoustic signal all frequencies above a predetermined frequency, the filter circuit having an output for outputting a filtered acoustic signal and a circuit for inverting the filtered acoustic signal, each acoustic signal detection channel further including a circuit for outputting a signal that represents the sum of then filtered acoustic signal and the inverted acoustic signal and which defines the processed acoustic signal; and a circuit for summing the processed acoustic signals outputted by the acoustic signal detection channels to form a single acoustic output signal and outputting the single acoustic output signal if at least one of the acoustic signal detection channels outputs a processed acoustic signal.

2. The apparatus according to claim 1 wherein the processing circuitry comprises a preamplifier circuit for amplifying the acoustic signal received from the corresponding acoustic signal sensor.

3. The apparatus according to claim 1 wherein the processing circuitry comprises a filter for removing the DC component from the received acoustic signals.

4. The apparatus according to claim 1 wherein the summing circuit further comprises circuitry for outputting an acoustic signal which is the inversion of the single acoustic signal outputted by the summing circuit.

5. The apparatus according to claim 4 further comprising a first output terminal for receiving the single acoustic signal outputted by the summing circuit and a second output terminal for receiving the inverted single acoustic signal, the first and second output terminals providing a differential signal if at least one of the acoustic signal detection channels outputs a processed acoustic signal.

6. The apparatus according to claim 1 wherein each acoustic signal sensor comprises a hydrophone.

7. The apparatus according to claim 1 wherein the predetermined frequency is between about 100 kHz and 300 kHz.

8. An apparatus for detecting acoustic signals from a plurality of acoustic signal sources comprising:

a plurality of acoustic signal sensors;

a plurality of amplifying circuits, each of which having an input for receiving acoustic signals from a corresponding acoustic signal sensor and outputting an amplified signal;

a plurality of D.C. component removing circuits, each of which receiving a corresponding amplified acoustic signal and removing D.C. components therefrom;

a plurality of filter circuits, each of which receiving a corresponding signal with removed D.C. components and removing all frequency components from the signals which are above a predetermined frequency, each filter circuit having an output for providing a filtered acoustic signal and circuitry for providing an inverted filtered acoustic signal;

a plurality of summing circuits, each of which receiving a filtered acoustic signal and an inverted filtered acoustic signal from a corresponding filter circuit and outputting a processed acoustic signal;

a circuit for summing all of the processed acoustic signals outputted from the summing circuits to form a single acoustic output signal; and additionally circuitry for converting the single acoustic signal into a differential signal if at least one acoustic signal sensor senses an acoustic signal and its corresponding processed acoustic signal is outputted.

9. The apparatus according to claim 8 wherein each acoustic signal sensor comprises a hydrophone.

10. A method for detecting acoustic signals from a plurality of acoustic signal sensors comprising:

providing an apparatus comprising a plurality of acoustic signal detection channels, each channel having an input for receiving acoustic signals from a corresponding acoustic signal sensor;

feeding into each acoustic signal detection channel an acoustic signal from a corresponding acoustic signal sensor;

processing the acoustic signal to remove the DC component from each acoustic signal inputted into each acoustic signal detection channel;

processing the acoustic signal to remove all frequency components from the signals which are above a predetermined frequency and provide a filtered acoustic signal and a signal that is the inversion of the filtered acoustic signal;

thereafter, summing the filtered acoustic and inverted filtered acoustic signals to provide a processed acoustic signal;

thereafter, summing the processed acoustic signals to form a single acoustic output signal; and outputting the single acoustic output signal if at least one of the acoustic signal detection channels outputs a processed acoustic signal.

11. The method according to claim 10 wherein processing further comprises amplifying the acoustic signals fed into each acoustic signal detection channel.

12. The method according to claim 10 wherein summing further comprises converting the single acoustic output signal into a differential signal.

* * * * *